J. R. COOK.
ELECTRIC MOTOR SWITCH.
APPLICATION FILED AUG. 9, 1917.

1,292,714.

Patented Jan. 28, 1919.
2 SHEETS—SHEET 1.

INVENTOR,
Joel R. Cook,
BY Bates & Macklin,
ATTYS.

J. R. COOK.
ELECTRIC MOTOR SWITCH.
APPLICATION FILED AUG. 9, 1917.

1,292,714.

Patented Jan. 28, 1919.
2 SHEETS—SHEET 2.

INVENTOR,
Joel R. Cook
BY, Bates & Macklin,
ATTYS

UNITED STATES PATENT OFFICE.

JOEL R. COOK, OF CLEVELAND, OHIO, ASSIGNOR TO THE DOMESTIC ELECTRIC COMPANY, OF CLEVELAND, OHIO, A CORPORATION OF OHIO.

ELECTRIC MOTOR-SWITCH.

1,292,714.  Specification of Letters Patent.  Patented Jan. 28, 1919.

Application filed August 9, 1917. Serial No. 185,237.

*To all whom it may concern:*

Be it known that I, JOEL R. COOK, a citizen of the United States, residing at Cleveland, in the county of Cuyahoga and State of Ohio, have invented a certain new and useful Improvement in Electric Motor-Switches, of which the following is a full, clear, and exact description, reference being had to the accompanying drawings.

This invention relates to centrifugal electric switches. The essential object of the invention is to provide a simple effective switch adapted to open or close a circuit when the rotary element to which it is attached attains a predetermined speed, and to reverse the movement when the speed falls below a predetermined point. A more particular object of the invention is to so construct the switch that its opening movement may be accomplished at a different speed from that at which the closing movement occurs. The switch is particularly designed for use in connection with motors of a type employing auxiliary starting windings in addition to a working winding and which auxiliary windings are cut out upon the attainment of a predetermined speed and remain electrically disconnected until the motor falls to a speed considerably below the cutting out speed.

More specific objects of the invention are to so construct the switch that it may be positive in operation, very quick in action avoiding sparking and wear, and capable of being manufactured from sheet metal by punching and stamping operations, thereby accomplishing its very cheap manufacture.

My invention is hereinafter more fully described in connection with the accompanying drawings, and the essential characteristics are summarized in the claims.

Figure 1:
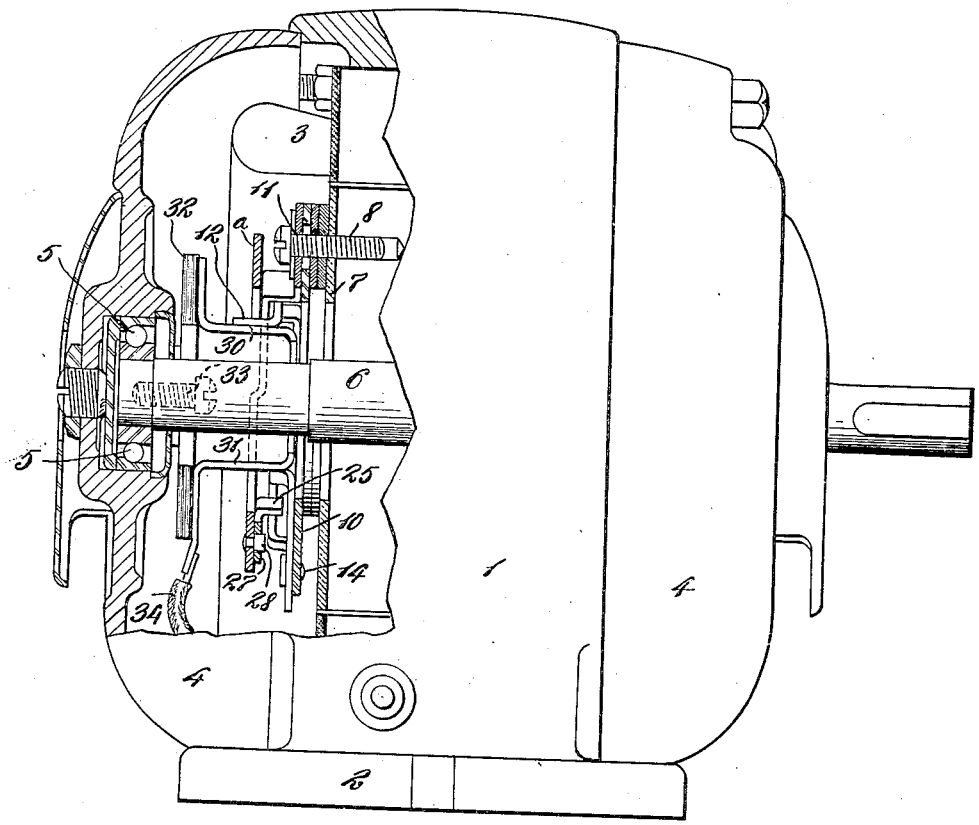
Figure 2:
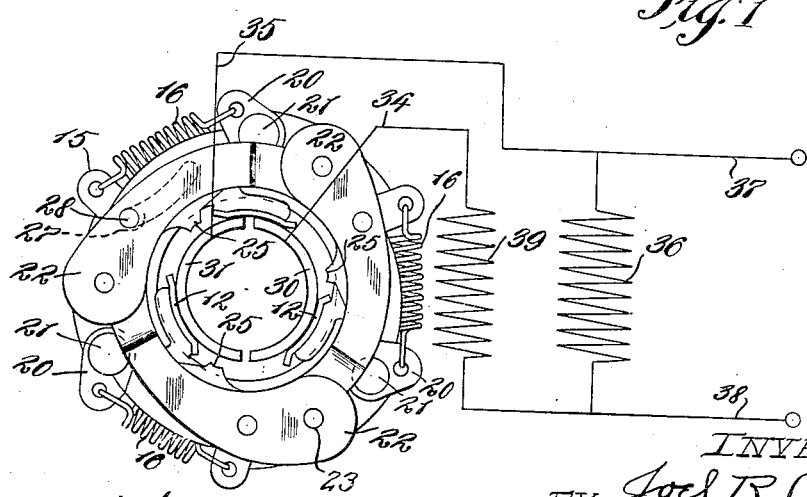
Figure 3:
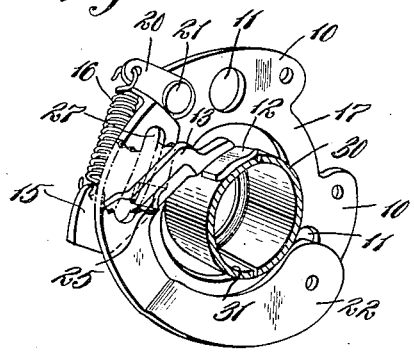
Figure 5:
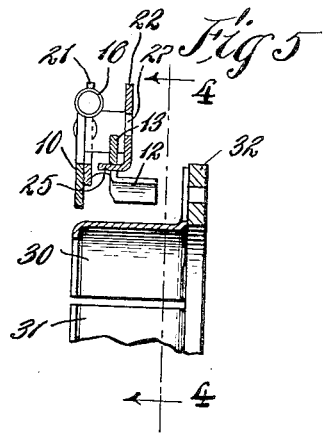
Figure 4:
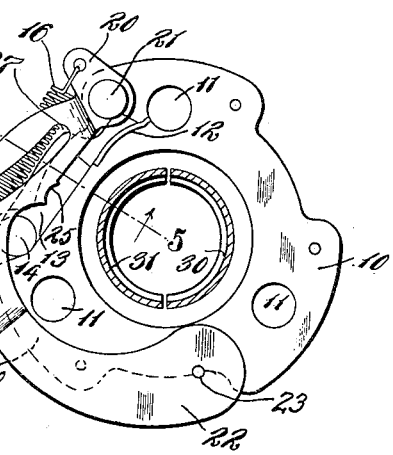
Figure 6:
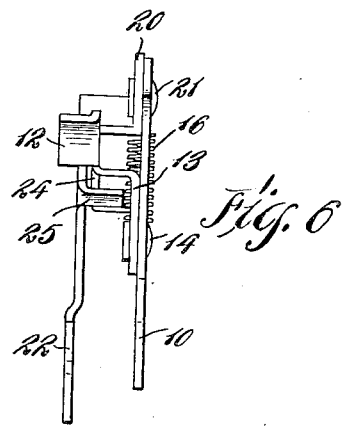

In the drawings, Figure 1 is a side elevation of a motor equipped with my invention, a portion of the motor being axially sectioned to illustrate the position of the switch parts. Fig. 2 illustrates the switch in end elevation, showing diagrammatically the circuit connections for a single phase motor. Fig. 3 is a perspective view of one switch element and its actuating centrifugal member and coacting spring mounted on the carrier. Fig. 4 is an end elevation similar to Fig. 2, showing a single switch element and its operative members in position. Fig. 5 is a radial section substantially on the line 5—5 in Fig. 4. Fig. 6 is an edge view of the parts shown in Fig. 4, omitting the contact ring.

Describing the parts by the use of reference characters, 1 indicates a motor housing integral with a suitable base 2 and carrying the field winding indicated at 3. End plates 4 are fitted to the part 1 and have suitable bearings indicated at 5 for an armature shaft 6. On the armature shaft is carried the usual rotor 7. Suitably insulated from the rotor 7 and carried rigidly thereby is a supporting disk 10 carrying movable switch contacts and actuating means therefor, to be hereinafter described. The contacts coact with the split ring forming a pair of contact segments 30 and 31, each having an outwardly turned flange portion secured to a support 32, rigidly secured to the end member 4 of the motor frame by screws indicated at 33. To these non-rotatable segments may be connected wires indicated at 34 and 35, one connected with each segment and leading to the coils, as will be presently described.

The disk 10 is shown as secured to the rotor by screws 8 extending through insulating washers 9 at each side of the plate, while the shank of the screw passes through an enlarged opening filled with insulating material. The disk 10 is thereby insulated from the rotor while securely fastened thereto. On this disk 10 are pivotally mounted a plurality of the contact lever carrying arms, preferably three in number, and shown as comprising arcuate contact portions 12 turned laterally from shank portions or arms 13 pivoted at 14 to the disk support 10. The screws 8 pass through openings 11 in this support, and the openings 11 are so spaced as to prevent the screw heads interfering with the movement of the contact arms. The contact arms have short outwardly extending arms 15, each provided with an opening receiving the end of a tension spring 16, standing opposite the edge of the disk which is cut away, as indicated at 17, to clear the spring. The other end of the spring is passed through an opening in a short arm 20 pivoted at 21 and integral with a centrifugal arm extending in an arcuate path around the segments 30 and 31 normally clearing the same at all times.

Three of the centrifugal arms 22 are arranged to overlap each other so that each arm may comprise more than a half circle and have its weighted end, opposite the pivot 21, stand in a position normally bringing the center of gravity of this arm nearly diametrically opposite this pivot, but just slightly off from the center, whereby the outward movement of each arm 22 may be accelerated under the action of the centrifugal force by reason of its center of gravity continually moving away from the center. This change of the center of gravity, from a point nearly opposite its pivot to a point bringing the line of force through the pivot and the center of gravity farther and farther from the center of rotation, increases the centrifugal component, so that the latter part of the outward movement of this arm is much more rapid than the first or inner portion of the movement. By adjusting the tension of the spring 16 in proper relation to the weight of the arms, I may cause this movement to occur suddenly after the rotor has attained the predetermined speed and thereby accomplish the entire outward movement of the arm during a comparatively few rotations of the rotor.

To cause this arm to move the contact 12 outwardly, I provide an offset reach in the arm 13 by splitting it longitudinally so that one portion lies adjacent the disk 10 and another portion stands outwardly therefrom in the path of a lug 25 integral with and turned inwardly from the inner edge of the centrifugal arm 22. It will be seen that the spring 16 tends to urge the arm 22 inwardly and at the same time to urge the contact 12 into engagement with the split ring segments 30 and 31. Now, as the arm 22 moves outwardly, the first portion of its movement preferably does not affect the movement of the contact member 12, but, on the contrary, stretches the spring 16, urging the contact more tightly into engagement with the ring, but upon the attainment of the predetermined speed, the finger 25 engages the shoulder 24 formed by the splitting and offsetting of the arm 13 and quickly raises the contact from the ring. Further increase of speed brings the contact to the position shown in Fig. 4, the arm 22 being moved outwardly to a position where its outward component is the greatest. A reduction of the speed then, to a very much lower speed than the speed at which the contact is moved outwardly, is necessary before the spring will overcome the centrifugal force acting at the maximum outward component of the arm 22.

I have found that the use of two contacts engaging the ring 30, while producing the theoretically correct operation, does not produce as good results as three or more contacts, the latter insuring two of the contacts always being urged against the surfaces of the segments at points other than their points of separation at all times. That is to say, while one contact is crossing the point of separation the other two contacts are pressed against the smooth surface of the respective segments as illustrated in Fig. 2, whereas, if only two contacts are depended upon to close the circuit through these segments, the irregularities incident to the separation between the segments cause, in actual practice, a sparking very difficult indeed to overcome.

In using three contacts it becomes necessary to provide means insuring their simultaneous separation from the segments. This I accomplish by providing slightly inwardly curved slots 27 in each of the arms, and on each arm I provide a pin 28 loosely engaging such slot and rigid in the arm which overlaps the slot. Thus, each of the centrifugal arms carries a pin 28 engaging the slot 27 in the arm which it overlaps, insuring a simultaneous expanding and contracting movement of a sectional ring formed by the overlapping centrifugal arms. The result is that no one of the arms can move outwardly independently of the others, and I may accordingly make these arms much more cheaply, as they do not have to be equally balanced and any inaccuracy of workmanship in the fitting of the arms and pivoting them to the carrier does not affect the simultaneous outward movement of the contacts.

In the embodiment shown, a motor circuit including a working coil is diagrammatically illustrated in Fig. 2 at 36 directly connected across the line wires 37 and 38. A starting coil 39 is connected at one end to the wire 38 and at its other end through the wire 34 to the segment 30. The segment 31 is connected through the wire 35 to the line wire 37. When the contacts 12 are in engagement with the segments 30 and 31 they form a constant bridge across these segments, the current passing from one segment to the other through any one contact arm to the disk ring 10 to another contact arm and to the opposite segment. Thus, during the starting of the motor, the switch is in the position shown in Fig. 2 in which the starting coil operates in parallel with the working coil 36 and the brushes 12, maintained in contact with the segments 30 and 31 by the springs 16 while rotating about the split ring formed by these segments, close the circuit across the same.

The weighted arms 22 may carry washers mounted at their outer ends and secured by rivets through openings 23 formed therein (the washers are omitted for clearness of illustration). When the rotor attains a predetermined speed the centrifugal arms start their outward movement, and as the rotor increases in speed the fingers 25 engage the contact-carrying arms at a time when the arms 22 are moving outwardly with comparative rapidity and the centrifugal force acting on these arms combined with that acting on the comparatively long arms carrying the contacts, causes the contacts to be suddenly separated from the segment members, breaking the circuit through the starting coil 39 and causing the current subsequently delivered to pass only through the working coils 36.

Upon shutting off the current passing through the coil 36 the motor at once diminishes its speed, but as the arms 22 are in the position at which the least centrifugal force is required to maintain their distended position the motor slows down to a very much lower speed than that at which the contacts were removed from the segments before the contacts are again brought into engagement therewith. By way of illustration, one form of motor on which I have employed this switch uses the starting coils up to substantially twelve hundred revolutions per minute, whereupon the contacts are almost instantaneously separated from the segments and the motor may then increase its speed up to about seventeen hundred fifty revolutions per minute, and may decrease its speed to substantially six hundred revolutions per minute before the contacts 12 again engage the segments.

By reason of interlocking the actuating levers and by reason of the construction shown, I am able to make the parts from comparatively cheaply formed sheet metal readily cut and punched into shape, thus forming a durable and cheap and yet effective switch.

Having thus described my invention, what I claim is:

1. In a centrifugal switch, the combination of a rotary support, a stationary contact, a coacting contact arm movably mounted upon the support and tending by reason of its own weight to move radially under the influence of centrifugal force, yielding means normally preventing such movement, a weighted arm movably mounted on said support, said weighted arm and contact arm having slight relatively independent movement and said weighted arm being adapted to engage and cause the actuation of the contact arm at a time when the rotary member attains a predetermined speed whereby the combined centrifugal pull on the weighted arm and contact arm may overcome the yielding means.

2. In a centrifugal switch, the combination of a rotary support, a stationary contact member, a coacting arm pivotally mounted on said support and tending by reason of its own weight to move under the influence of centrifugal force, yielding means normally preventing such movement, a weighted arm pivotally mounted on said support and adapted to move under the influence of centrifugal force and adapted to engage and cause the movement of the contact arm consequent upon the attainment of a predetermined speed of rotation.

3. In a centrifugal switch, the combination of a rotary support, movable contact members mounted upon said support, weighted members movably mounted on the support and adapted to actuate the contact members, a spring connecting each contact member with a weighted member and normally preventing outward movement of each.

4. In a centrifugal switch, the combination of a rotary support, movable contact members mounted upon said support, weighted members rotated by the support and adapted to actuate the contact members, yielding means connecting each contact member with a weighted member and normally preventing outward movement of each, whereby the contacts may be moved consequent upon the attainment of a predetermined speed, and means for causing a simultaneous movement of the contact members.

5. The combination, in a centrifugal switch, of a rotary support, stationary contact ring members, a plurality of arms carrying contact members and pivoted at one end to the support, springs connected with said arms for urging the contacts into engagement with the segments, said contact members and arms tending to move outwardly under the influence of centrifugal force, weighted arms pivoted to the support and each connected with the other end of one of said springs whereby each spring may urge a contact and a weighted arm inwardly.

6. The combination in a centrifugal switch of a rotary support, a stationary contact ring, a plurality of arms carrying the contact members and pivoted at one end to the support, springs connected with said arms for urging the contacts into engagement with the ring, said contact members and arms tending to move outwardly under the influence of centrifugal force, weighted levers pivoted to the support and each having a portion extending outwardly from the pivot and connected with the other end of one of said springs whereby each spring may urge a contact and an arm inwardly.

7. In a centrifugal switch, the combination of a rotary support, a contact ring about the axis of the support, a plurality of arms curved about said ring and each pivoted to the support and having its center of gravity so positioned that it is substantially but not quite diametrically opposite the pivot of the arm and whereby the outward movement of the arm increases the outward component of its centrifugal pull, a plurality of movable contact members carried by the support and by their own weight tending to move radially, means tending to hold them in contact with the ring, and means on each of the arms for engaging and quickly moving one of the contact members away from the ring.

8. In a centrifugal switch, the combination of a rotary support, circular contact elements, contacts engaging the same and revolved by the support, yielding means for urging each of the contacts toward said contact elements, an annulus of three or more overlapping and successively articulated members carried by the support and adapted to expand under the influence of centrifugal force, and an element on the annulus for actuating each contact member, each contact being capable of radial movement relative to its element.

9. In a centrifugal switch, the combination of a rotary support, a stationary contact element, a contact engaging the same and revolved by the support, yielding means for urging the contacts toward said contact element, an annulus of overlapping members carried by the support and successively jointed so as to be relatively slidable and to cause them to move in unison to expand under the influence of centrifugal force, and means on the annulus for disengaging the contact member.

10. In a centrifugal switch, the combination of a rotary support, separated contact ring members, a plurality of contact members carried by the support, said contacts being carried on arms pivoted to the support and having outwardly extending ears, springs connected with the ears and extending approximately tangentially therefrom, a pivoted weight lever for actuating each contact pivoted to the support, each such lever having a corresponding ear attached to the other end of one of said springs, whereby each spring urges a contact and an arm inwardly, and means carried by each lever, and adapted to move the contacts outwardly as the levers are moved outwardly by centrifugal force.

11. In a centrifugal switch, the combination of a rotary support, a contact member carried pivotally by the support, and having an outwardly extending ear, a spring connected with the ear and extending approximately tangentially therefrom, a pivoted weight lever member for actuating said contact and pivoted to the support and having an ear attached to the other end of said spring, whereby said spring urges the contact member toward the ring, a projection carried by one of said members, and a shoulder on the other member adapted to be engaged thereby to cause the contact member to move outwardly as the lever member is moved outwardly by centrifugal force.

12. In a centrifugal switch, the combination of a rotary support, a plurality of contact members, arms carrying the contacts and pivoted to the support, springs connected with the arms, pivoted weight lever arms for actuating each contact pivoted to the support, each lever being attached to one of said springs, whereby each spring urges a contact arm and a weight lever arm inwardly, coacting projections and shoulders carried by the weight and contact arms to move the contacts outwardly as the levers are moved outwardly by centrifugal force, each lever arm overlapping another lever arm and extending in a substantially arcuate path.

13. In a centrifugal switch, the combination of a rotary support, separated circular contact members, a plurality of contact members carried by the support, said contacts being carried on arms pivoted to the support and having outwardly extending ears, springs connected with the ears and extending approximately tangentially therefrom, a pivoted weight lever for actuating each contact pivoted to the support, each such lever having a corresponding ear attached to the other end of one of said springs, whereby each spring urges a contact and an arm inwardly, a projection carried by each lever, and a shoulder on each contact arm adapted to be engaged thereby to move the contacts outwardly as the levers are moved outwardly by centrifugal force, each lever overlapping another lever and extending in a substantially arcuate path, the levers being offset for substantially the thickness of the lever whereby they may nest one on the other.

In testimony whereof, I hereunto affix my signature.

JOEL R. COOK.